United States Patent Office 3,565,894
Patented Feb. 23, 1971

3,565,894
PYRIMIDINYL ESTERS OF
DITHIOCARBAMIC ACIDS
John Joseph D'Amico, Dunbar, W. Va., assignor to Monsanto Company, St. Louis, Mo., a corporation of Delaware
No Drawing. Filed May 15, 1967, Ser. No. 638,595
Int. Cl. C07d 51/42
U.S. Cl. 260—247.1                    15 Claims

ABSTRACT OF THE DISCLOSURE

Heterocyclic esters of dithiocarbamic acids wherein the heterocycle contains 3 or 4 carbon atoms and two meta nitrogen atoms and is attached at the carbon between the nitrogen atom, which esters are useful for accelerating the vulcanization of rubber.

---

The present invention relates to a new class of products, namely, meta dinitrogen heterocycle esters of dithiocarbamic acids, and to their use for accelerating the vulcanization of rubber.

Salts of dithiocarbamic acids have achieved wide acceptance for accelerating vulcanization of sulfur-vulcanizable rubbers, but esters have been heretofore much less effective. The meta dinitrogen heterocycle esters, however, are potent accelerators.

The new compounds may be represented by the formula $$Z-S-C{\overset{S}{\underset{}{\diagdown}}}N{\diagup}{\diagdown}$$

where Z is a heterocycle, the ring members of which consist of three or four carbon atoms and two metal nitrogen atoms, which heterocycle is attached to sulfur at the carbon between the nitrogen atom. One of the bonds between said intermediate carbon atom and the two nitrogen atoms is unsaturated. Substituents may be present on one or more of the other carbon atoms. More particularly, Z is unsubstituted 2-pyrimidinyl, 2-pyrimidinyl containing one or more substituents, unsubstituted dihydro-2-pyrimidinyl, dihydro-2-pyrimidinyl containing one or more substituents, unsubstituted tetrahydro-2-pyrimidinyl, tetrahydro-2-pyrimidinyl containing one or more substituents, unsubstituted 2-imidazolyl, 2-imidazolyl containing one or more substituents, unsubstituted 2-imidazolinyl, or 2-imidazolinyl containing one or more substituents. The substituents may comprise lower alkyl, aralkyl; e.g., benzyl, alicyclic, or aryl. The

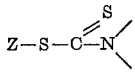

group is the residue of a thiocarbamyl radical.

The new compounds can be prepared by the alkaline condensation of a thiocarbamyl halide with ZSH, where Z is a heterocycle as defined. The following are typical examples of suitable mercaptans:

2-mercaptoimidazole
2-mercapto-4,5-dimethylimidazole
2-mercaptoimidazoline
5,5-dimethyl-2-mercapto-3-phenyl-1-imidazoline
2-mercapto-1-phenyl-2-imidazoline
2-mercapto-benzimidazole
4-methyl-2-mercaptoimidazoline
2-mercapto-3,4,5,6-tetrahydropyrimidine
2-mercapto-5-methyl-3,4,5,6-tetrahydropyrimidine
2-mercapto-3-isopropyl-4,6,6-trimethyl-dihydropyrimidine
2-mercapto-3-cyclohexyl-4,6,6-trimethyl-dihydropyrimidine
2-mercapto-3-alphanaphthyl-4,6,6-trimethyl-dihydropyrimidine
2-mercapto-3-phenyl-4,6,6-trimethyl-dihydropyrimidine
2-mercapto-3-o-tolyl-4,6,6-trimethyl-dihydropyrimidine
2-mercapto-4,6,6-trimethyl-dihydropyrimidine
2-mercapto-4,4,6-trimethyl-dihydropyrimidine
2-mercapto-4-ethyl-3,4,5,6-tetrahydropyrimidine
2-mercapto-4,4-diethyl-3,4,5,6-tetrahydropyrimidine
2-mercapto-5-methyl-3,4,5,6-tetrahydropyrimidine
2-mercapto-5,5-dibutyl-3,4,5,6-tetrahydropyrimidine
2-mercapto-4-alphanaphthyl-3,4,5,6-tetrahydropyrimidine
2-mercapto-3,4,5,6-tetrahydropyrimidine
2-mercaptopyrimidine.

In the case of pyrimidinyl mercaptans, 2-mercapto-4,6-dimethylpyrimidine is readily obtained from existing raw materials and yields especially effective accelerators. The hydrochloride of 2-mercapto-4,6-dimethylpyrimidine is a commercially available intermediate which will be hereinafter designated "hydrochloride intermediate." The 4,6-dimethyl-mercaptopyrimidine base is conveniently formed in situ by addition of alkali and condensed with the desired thiocarbamyl halide. The chlorides are usually satisfactory, but bromides and iodides can be used. The amino substituent of the thiocarbamyl halide is preferably secondary amino. In

x and y independently can be lower alkyl, for example methyl, ethyl, propyl, butyl, or amyl; lower alkenyl, for example allyl or methallyl; lower akenyl substituted by halogen, for example 2-chloroallyl or 2-bromoallyl; alicyclic, for example cyclopentyl or cyclohexyl; aralkyl, for example benzyl or phenethyl; aryl, for example phenyl, tolyl, or naphthyl; or taken together with the nitrogen form a heterocycle of four to eight carbon atoms, for example pyrrolidinyl, piperidino, 2-methyl-5-ethylpiperidino, hexamethylenimino, morpholino, 2,6-dimethylmorpholino, 2,5-dimethylpyrrolidinyl, heptamethylenimino, and octamethylenimino.

The following examples illustrate the preparation of the new compounds but are not to be taken as limitative.

EXAMPLE 1

To a stirred solution comprising 44.2 grams (0.25 mole) of the hydrochloride intermediate, 80 grams (0.5 mole) of 25% sodium hydroxide, and 300 ml. of acetone was added dropwise at 25°–30° C. 37.4 grams (0.25 mole) of 1-pyrrolidinyl thiocarbonyl chloride dissolved in 200 ml. of acetone. The mixture was stirred for 24 hours at 25°–30° C. whereupon it was added to 1,000 grams of ice water. After stirring for an hour, the precipitate was collected by filtration, washed with water until the washings were neutral to litmus, and air-dried at 25°–30° C. 4,6 - dimethyl-2-pyrimidinyl 1-pyrrolidinecarbodithioate was obtained in 28.4% yield as a tan solid. After recrystallization from heptane/alcohol, it melted at 143°–145° C. Analysis gave 25.75% sulfur compared to 25.31% calculated for $C_{11}H_{15}N_3S_2$.

Employing substantially the same reaction conditions and replacing the 1-pyrrolidinyl thiocarbonyl chloride with an equimolar amount, respectively, of 1-piperidinyl thiocarbonyl chloride, 4-morpholinyl thiocarbonyl chloride, and diisopropyl thiocarbamyl chloride, further examples were prepared possessing the following physical properties.

EXAMPLE 2

4,6 - dimethyl - 2 - pyrimidinyl 1 - piperidinecarbodithioate, a tan solid, M.P. 84°–86° C. after recrystallization from heptane/alcohol, in 86% yield. Analysis gave 15.70% nitrogen and 24.45% sulfur compared to 15.72% nitrogen and 23.98% sulfur calculated for $C_{12}H_{17}N_3S_2$.

EXAMPLE 3

4,6 - dimethyl - 2 - pyrimidinyl 4 - morpholinecarbodithioate, a tan solid, M.P. 104–106° C. after recrystallization from ethyl alcohol, in 67% yield. Analysis gave 15.92% nitrogen and 23.98% sulfur compared to 15.60% nitrogen and 23.81% sulfur calculated for $C_{11}H_{15}N_3OS_2$.

EXAMPLE 4

4,6 - dimethyl - 2 - pyrimidinyl diisopropyldithiocarbamate, a tan solid, M.P. 170°–172° C. after recrystallization from heptane, in 28.2% yield. Analysis gave 23.26% sulfur compared to 22.63% calculated for $C_{13}H_{21}N_3S_2$.

EXAMPLE 5

Substituting an equimolar amount of dibutyl thiocarbamyl chloride for the 1-pyrrolidinyl thiocarbonyl chloride in Example 1, the mixture was stirred at 25°–30° C. for 24 hours, then 250 ml. of water and 300 ml. of ethyl ether added and stirring continued for 15 minutes. The ether layer which separated was washed with 200 ml. of water and dried over sodium sulfate. Ether was removed in vacuo at a maximum temperature of 80°–90° C./1–2 mm. 4,6 - dimethyl - 2 - pyrimidinyl dibutyldithiocarbamate was obtained in 84.2% yield as an amber oil. Analysis gave 20.83% sulfur compared to 20.59% calculated for $C_{15}H_{25}N_3S_2$.

EXAMPLE 6

To a stirred solution containing 44.2 grams (0.25 mole) of hydrochloride intermediate, 80 grams (0.5 mole) of 25% sodium hydroxide, and 400 ml. of acetone was added, dropwise at 10°–20° C., 44.4 grams (0.25 mole) of

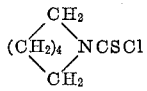

dissolved in 200 ml. of acetone and the mixture stirred for 18 hours at 25°–30° C. By-product salt was removed by filtration, the filtrate added to 2,000 grams of ice water, and the mixture stirred at 0°–10° C. for 30 minutes. The precipitate was collected by filtration, washed with water until the washings were neutral to litmus, and air-dried at 25°–30° C. 4,6 - dimethyl - 2 - pyrimidinyl hexahydro - 1H - azepine - 1 - carbodithioate was obtained in 85.5% yield as a tan solid melting at 90°–92° C. after recrystallization from heptane. Analysis gave 14.62% nitrogen compared to 14.93% calculated for $C_{13}H_{19}N_3S_2$.

EXAMPLE 7

To a stirred solution comprising 44.2 grams (0.25 mole) of hydrochloride intermediate, 80 grams (0.5 mole) of 25% sodium hydroxide, and 300 ml. of acetone was added dropwise in 30 minutes at 25°–30° C., 37.9 grams (0.25 mole) of diethylthiocarbamyl chloride dissolved in 300 ml. of acetone. The mixture was stirred at 25°–30° C. for 24 hours and then 500 grams of water added. After stirring for 15 minutes, the product was salted out by means of sodium chloride and extracted with 500 ml. of ethyl ether. The ether solution was dried over sodium sulfate and the ether removed in vacuo at a maximum temperature of 80°–90° C./1–2 mm. 4,6-dimethyl - 2 - pyrimidinyl diethyldithiocarbamate was obtained in 70.4% yield as an aber semi-solid. Analysis gave 15.48% nitrogen and 24.22% sulfur compared to 16.45% nitrogen and 25.11% sulfur calculated for $C_{11}H_{17}N_3S_2$.

EXAMPLE 8

Substituting an equimolar amount of dipropylthiocarbamyl chloride for the diethylthiocarbamyl chloride in Example 7, 4,6 - dimethyl - 2 - pyrimidinyl dipropyldithiocarbamate was obtained in 93.5% yield as a low melting tan solid. Analysis gave 14.80% nitrogen and 22.47% sulfur compared to 14.83% nitrogen and 22.63% sulfur calculated for $C_{13}H_{21}N_3S_2$.

EXAMPLE 9

Substituting an equimolar amount of dimethyl thiocarbamyl chloride for the diethyl thiocarbamyl chloride in Example 7, the product was salted out by means of sodium chloride. It was then filtered and the filtrate air-dried. 4,6 - dimethyl - 2 - pyrimidinyl dimethyldithiocarbamate was obtained in 72.2% yield as a tan solid. After recrystallization from ethyl alcohol, it melted at 108°–110° C. Analysis gave 18.57% nitrogen and 27.40% sulfur compared to 18.48% nitrogen and 28.21% sulfur calculated for $C_9H_{13}N_3S_2$.

EXAMPLE 10

To a stirred solution comprising 44.2 grams (0.25 mole) of hydrochloride intermediate, 80 grams (0.5 mole) of 25% sodium hydroxide, and 300 ml. of water was added in one portion 48.4 grams (0.25 mole) of 2,6 - dimethyl - 4 - morpholinyl thiocarbonyl chloride and the mixture stirred at 25°–30° C. for 6 hours. The precipitate was collected by filtration, washed with water until neutral to litmus, and air-dried at 25°–30° C. 4,6-dimethyl - 2 - pyrimidinyl 2,6 - dimethyl - 4 - morpholinecarbodithioate was obtained in 66% yield as a tan solid. After recrystallization from ethyl alcohol, it melted at 112°–113° C. Analysis gave 13.19% nitrogen compared to 14.13% calculated for $C_{13}H_{19}N_3OS_2$.

EXAMPLE 11

Substituting an equimolar amount of N-ethyl thiocarbaniloyl chloride for the 2,6 - dimethyl - 4 - morpholinyl thiocarbonyl chloride in Example 10, the mixture was stirred at 25°–30° C. for 24 hours. A semi-solid resulted to which was added 300 ml. of ethyl ether and stirring continued at 25°–30° C. for 30 minutes. After cooling to 0° C., the precipitate was collected by filtration and air-dried at 25°–30° C. 4,6 - dimethyl - 2 - pyrimidinyl N-ethyldithiocarbanilate was obtained in 39.8% yield as a pink solid. After recrystallization from heptane/alcohol, it melted at 134°–135° C. Analysis gave 21.92% sulfur compared to 21.13% calculated for $C_{15}H_{17}N_3S_2$.

The pyrimidinyl esters of the invention accelerate the vulcanization of sulfur-vulcanizable diene rubbers, either natural or synthetic. These rubbers contain sufficient unsaturation to render them reactive with sulfur. Examples are butyl rubber, cis-4-polybutadiene, ethylene-propylene terpolymers (EPDM), polyisoprene, butadiene-1,3 homopolymers, butadiene-1,3 copolymers with other monomers, for example styrene, acrylonitrile, isobutylene, and methylmethacrylate. The accelerating properties are illustrated by the following embodiments wherein a base stock was compounded comprising:

| | Parts by weight |
|---|---|
| Smoked sheets rubber | 100.0 |
| Carbon black | 50.0 |
| Zinc oxide | 5.0 |
| Stearic acid | 3.0 |
| Saturated hydrocarbon softener | 3.0 |
| Antioxidant (Neozone D) | 1.0 |
| Sulfur | 2.5 |

To each of several portions of the base stock was added 0.5 part by weight of accelerator as indicated below:

| Stock | Accelerator |
|---|---|
| A | 4,6-dimethyl-2-pyrimidinyl 1-pyrrolidinecarbodithioate. |
| B | 4,6-dimethyl-2-pyrimidinyl diethyldithiocarbamate. |
| C | 4,6-dimethyl-2-pyrimidinyl 1-piperidinecarbodithioate. |
| D | 4,6-dimethyl-2-pyrimidinyl dipropyldithiocarbamate. |
| E | 4,6-dimethyl-2-pyrimidinyl dimethyldithiocarbamate. |
| F | 4,6-dimethyl-2-pyrimidinyl dibutyldithiocarbamate. |
| G | 4,6-dimethyl-2-pyrimidinyl 4-morpholinecarbodithioate. |
| H | 4,6-dimethyl-2-pyrimidinyl 2,6-dimethyl-4-morpholinecarbodithioate. |
| J | 4,6-dimethyl-2-pyrimidinyl N-ethyldithiocarbanilate. |
| K | 4,6-dimethyl-2-pyrimidinyl hexahydro-1H-azepine-1-carbodithioate. |
| L | 4,6-dimethyl-2-pyrimidinyl diisopropyldithiocarbamate. |

The stocks were cured in the usual manner by heating in a press for different periods of time at 144° C. Processing safety of the vulcanizable stocks was evaluated by means of a Mooney plastometer. The figures recorded were the times required for the Mooney plasticity at 135° C. to rise ten points above the minimum value. The modulus and tensile properties of the 45- and 60-minute cures are recorded. Hereinafter, "modulus" means modulus of elasticity in pounds per square inch at 300% elongation, and "tensile" means tensile strength at break in pounds per square inch.

TABLE I

| Stock | Cure in minutes | Modulus | Tensile | Mooney scorch |
|---|---|---|---|---|
| A | 45 | 2,640 | 4,048 | 9.1 |
|   | 60 | 2,834 | 3,885 |     |
| B | 45 | 2,021 | 3,537 | 11.6 |
|   | 60 | 1,936 | 3,617 |     |
| C | 45 | 2,750 | 3,916 | 9.5 |
|   | 60 | 2,567 | 3,526 |     |
| D | 45 | 2,114 | 3,792 | 10.4 |
|   | 60 | 2,158 | 3,786 |     |
| E | 45 | 2,247 | 3,800 | 10.6 |
|   | 60 | 2,199 | 4,100 |     |
| F | 45 | 2,392 | 3,828 | 10.1 |
|   | 60 | 2,484 | 3,567 |     |
| G | 45 | 2,475 | 3,784 | 9.5 |
|   | 60 | 2,401 | 3,485 |     |
| H | 45 | 2,230 | 4,050 | 7.3 |
|   | 60 | 2,280 | 4,050 |     |
| J | 45 | 2,280 | 4,050 | 11.7 |
|   | 60 | 2,250 | 3,840 |     |
| K | 45 | 2,650 | 4,250 | 7.7 |
|   | 60 | 2,790 | 4,190 |     |
| L | 45 | 2,010 | 3,700 | 9.8 |
|   | 60 | 2,030 | 3,490 |     |

In a similar manner the new compounds were tested as vulcanization accelerators in a synthetic rubber. Butadiene-styrene copolymer rubber was blended in a standard formula as follows:

| | Parts by weight |
|---|---|
| SB-R 1712 [1] | 137.5 |
| Philblack I (ISAF) | 65.0 |
| Zinc oxide | 3.0 |
| Stearic acid | 1.0 |
| Aromatic processing oil (Sundex 53) | 1.5 |

[1] Butadiene-styrene copolymer made by a cold emulsion polymerization system using a fatty acid and rosin soap emulsifiers and extended with 37.5 parts of a highly aromatic processing oil.

To each of several portions of the base stock was added 0.5 part by weight of accelerator as indicated below:

| Stock | Accelerator |
|---|---|
| M | 4,6-dimethyl-2-pyrimidinyl 1-piperidinecarbodithioate. |
| N | 4,6-dimethyl-2-pyrimidinyl 4-morpholinecarbodithioate. |
| O | 4,6-dimethyl-2-pyrimidinyl dibutyldithiocarbamate. |
| P | 4,6-dimethyl-2-pyrimidinyl 1-pyrrolidinecarbodithioate. |
| Q | 4,6-dimethyl-2-pyrimidinyl 2,6-dimethyl-4-morpholinecarbodithioate. |
| R | 4,6-dimethyl-2-pyrimidinyl N-ethyldithiocarbanilate. |
| S | 4,6-dimethyl-2-pyrimidinyl hexahydro-1H-azepine-1-carbodithioate. |

The compositions were vulcanized by heating for different periods of time in the usual manner in a press at 144° C. The modulus and tensile properties of the 60-minute cures are recorded below except for Stock S for which properties of the 45-minute cure are recorded.

TABLE II

| Stock | Modulus | Tensile |
|---|---|---|
| M | 2,820 | 3,600 |
| N | 2,690 | 3,740 |
| O | 2,080 | 3,700 |
| P | 2,850 | 3,500 |
| Q | 2,620 | 3,480 |
| R | 1,700 | 3,500 |
| S | 3,290 | 3,290 |

The accelerating properties and processing safety in the following stock further illustrate the invention:

| | Parts by weight |
|---|---|
| SB-R 1500 [1] | 100.0 |
| Carbon black (high abrasion furnace) | 50.0 |
| Zinc oxide | 4.0 |
| Stearic acid | 2.0 |
| Saturated hydrocarbon softener (Paraflux) | 10.0 |
| Sulfur | 1.75 |

[1] Cold, non-pigmented polymer, target bound styrene 23.5%.

Tests were carried out employing the compounds on an equimolar basis. To the above there was added in separate stocks accelerator as follows:

| Stock | Parts by weight | Accelerator |
|---|---|---|
| T | 1.2 | 4,6-dimethyl-2-pyrimidinyl dimethyldithiocarbamate. |
| U | 1.35 | 4,6-dimethyl-2-pyrimidinyl diethyldithiocarbamate. |
| V | 1.5 | 4,6-dimethyl-2-pyrimidinyl dipropyldithiocarbamate. |

Vulcanization was completed at a temperature of 144° C. The modulus and tensile properties and Mooney scorch are recorded in Table III.

TABLE III

| Stock | Cure in minutes | Modulus | Tensile | Mooney scorch |
|---|---|---|---|---|
| T | 60 | 2,376 | 3,479 | 11.9 |
|   | 90 | 2,894 | 3,371 |      |
|   | 120 | 2,944 | 3,328 |     |
| U | 60 | 2,052 | 3,408 | 16.4 |
|   | 90 | 2,492 | 3,226 |      |
|   | 120 | 2,593 | 3,434 |     |
| V | 60 | 1,908 | 3,443 | 17.4 |
|   | 90 | 2,372 | 3,299 |      |
|   | 120 | 2,457 | 3,150 |     |

As further exemplification of accelerating properties and processing safety, rubber compositions were prepared which contained a retarder of vulcanization. A stock was compounded comprising:

| | Parts by weight |
|---|---|
| Smoked sheets rubber | 100.0 |
| Carbon black (high abrasion furnace) | 50.0 |
| Zinc oxide | 5.0 |
| Stearic acid | 3.0 |
| Saturated hydrocarbon softener | 10.0 |
| Sulfur | 2.5 |
| N-nitrosodiphenylamine | 1.0 |

To the above there was added in separate stocks 0.5 part of accelerator as follows:

| Stock | Accelerator |
|---|---|
| W | 4,6-dimethyl-2-pyrimidinyl 2,6-dimethyl-4-morpholinecarbodithioate. |
| X | 4,6-dimethyl-2-pyrimidinyl N-ethyldithiocarbanilate. |
| Y | 4,6-dimethyl-2-pyrimidinyl hexahydro-1H-azepine-1-carbodithioate. |

Vulcanization was completed at a temperature of 144° C. The modulus and tensile properties and Mooney scorch are recorded in Table IV.

TABLE IV

| Stock | Cure in minutes | Modulus | Tensile | Mooney scorch |
|---|---|---|---|---|
| W | 45 | 2,350 | 4,220 | 16.7 |
|   | 60 | 2,280 | 4,250 |      |
| X | 45 | 2,330 | 4,500 | 21.4 |
|   | 60 | 2,250 | 4,230 |      |
| Y | 45 | 2,820 | 4,200 | 16.3 |
|   | 60 | 2,820 | 4,250 |      |

Some of the compounds are biologically active.

As illustrative of biological activity of the compounds of this invention, compositions were prepared according to common methods for convenience of application for the control of various organisms. The concentration of the compounds in the carrier or vehicle varied depending upon the organisms being treated and the particular compound of the generic formula employed.

The exemplary procedures which illustrate effectiveness as soap bacteriostats consisted essentially of adding a stated amount of the compound to a soap solution and preparing serial dilutions of this composition in agar. The agar dilutions were then inoculated with different microbes, incubated at a definite temperature for a definite time, after which the dilutions were examined to determine inhibition of growth by the test compound.

The following experiment demonstrated toxicity against *Staphylococcus aureus*. A 1%-stock solution of the test material prepared in a non-toxic solvent was diluted in agar to provide test samples containing various concentrations of the test material. Petri dishes were respectively filled with the test mixture, and the plates thus prepared were then respectively inoculated with said *Staphylococcus aureus* organism and incubated for 48 hours at 37° C. At the end of that time inspection of the plates inoculated with the following test materials showed complete inhibition of growth of the organism at the indicated concentration while identical agar test plates, except that no test material was present, showed normal uninhibited bacterial growth. ($T=1,000$.)

TABLE V

| Test material: | Concentration |
|---|---|
| 4,6-dimethyl-2-pyrimidinyl dimethyldithiocarbamate | 1/10T |
| 4,6-dimethyl-2-pyrimidinyl 1-piperidinecarbodithioate | 1/T |
| 4,6-dimethyl-2-pyrimidinyl dibutyldithiocarbamate | 1/T |
| 4,6-dimethyl-2-pyrimidinyl 1-pyrrolidinecarbodithioate | 1/10T |
| 4,6-dimethyl-2-pyrimidinyl N-ethyldithiocarbanilate | 1/T |
| 4,6-dimethyl-2-pyrimidinyl hexahydro-1H-azepine-1-carbodithioate | 1/T |

In the following table is shown the toxic effect provided by some of the compounds of this invention against the fungus *Aspergillus niger*. A 1.0%-stock solution of the test material in a non-toxic solvent was made up, and this solution was added to sterile, melted dextrose agar in a quantity to give various concentrations of test material. After thorough mixing, the agar was poured into Petri dishes and allowed to harden. One drop of a spore suspension of the fungus was applied as inoculum for each plate. The inoculated plates were incubated at a suitable temperature for 5 days. At the end of that time, inspection of the dishes showed complete inhibition of growth while plates not containing test material but otherwise identical and incubated similarly showed uninhibited growth.

TABLE VI

| Test material: | Concentration |
|---|---|
| 4,6-dimethyl-2-pyrimidinyl dimethyldithiocarbamate | 1/T |
| 4,6-dimethyl-2-pyrimidinyl 1-piperidinecarbodithioate | 1/T |
| 4,6-dimethyl-2-pyrimidinyl 1-pyrrolidinecarbodithioate | 1/T |
| 4,6-dimethyl-2-pyrimidinyl hexahydro-1H-azepine-1-carbodithioate | 1/T |

Pre-emergent herbicidal activity of certain compounds was demonstrated by dispersing the compound in water and applying as a spray. In this manner the active ingredient at a dosage of 25 pounds per acre was applied to the ground of seeded plots before the grass or other plates emerged. About fourteen days after application of the toxicants, results were observed and recorded. The number of seeds emerging was converted to weighted herbicidal ratings based on average percent germination of a particular seed lot times an injury factor. This evened irregularities of ratings on seeds which might vary in percent germination. The injury factor took into consideration any plants not expected to survive. Thus, phytotoxicity ratings were based on the number of plants which emerged and would survive as observed two weeks after planting. Herbicidal ratings were assigned by means of the following conversion scale.

| Percent emergence: | Phytotoxicity rating |
|---|---|
| 0–25 | 3 or severe. |
| 26–50 | 2 or moderate. |
| 51–75 | 1 or slight. |
| 76–100 | 0 or none. |

TABLE VII

| | |
|---|---|
| 4,6-dimethyl-2-pyrimidinyl diethyldithiocarbamate. | Severe phytotoxicity to rye grass and pigweed; moderate phytotoxicity to wild oat. |
| 4,6-dimethyl-2-pyrimidinyl 1-piperidinecarbodithioate. | Severe phytotoxicity to pigweed and wild buckwheat; moderate phytotoxicity to radish. |
| 4,6-dimethyl-2-pyrimidinyl 4-morpholinecarbodithioate. | Severe phytotoxicity to morning glory and soybean; moderate phytotoxicity to pigweed and wild buckwheat. |

The example following illustrates the preparation of a meta dinitrogen heterocycle ester in which the heterocycle contains three carbon atoms in the ring and one phenyl substituent outside the ring.

EXAMPLE 12

The 5,5-dimethyl-2-mercapto-3-phenyl-1-imidazoline required for this example was obtained by adding 60.8 grams (0.6 mole) of carbon bisulfide in one portion to a stirred solution of 49.3 grams (0.3 mole) of N-(2-amino-2-methyl)propyl aniline, 150 ml. of ethyl alcohol, and two drops of piperidine. The mixture was heated at refluxing temperature (47°–68° C.) for 24 hours, cooled to 0° C., and then stirred at 0°–10° C. for an hour. After filtering, the product was air-dried at 25°–30° C. giving a white solid, M.P. 171°–172° C. in 86.5% yield. Upon recrystallization from alcohol, the M.P. was unchanged. The product analyzed 13.43% nitrogen and 15.57% sulfur compared to 13.58% nitrogen and 15.54% sulfur calculated for $C_{11}H_{14}N_2S$. Although the product is named on the basis of the mercaptan form, it is probably in the tantomeric thione form. However, reaction in alkaline medium apparently involves the sulfur.

To a stirred solution comprising 20.7 grams (0.1 mole) of the 5,5-dimethyl-2-mercapto-3-phenyl-1-imidazoline so prepared, 6.6 grams (0.1 mole) of 85% potassium hydroxide, 300 ml. of acetone, and 20 ml. of water was added in one portion 15.2 grams (0.1 mole) of diethylthiocarbamyl chloride. The mixture was stirred for 18 hours at 25°–30° C. whereupon there was added 500 ml. of ethyl ether and 500 ml. of water. After stirring for 15 minutes, the separated ether solution was washed with water until neutral and dried over sodium sulfate. The ether was removed in vacuo at a maximum temperature of 80°–90° C./1–2 mm. 5,5-dimethyl-3-phenyl-2-imidazolinyl diethyldithiocarbamate was obtained as a viscous amber liquid in 81.5% yield. Analysis gave 12.16% nitrogen and 19.17% sulfur compared to 13.07% nitrogen and 19.95% sulfur calculated for $C_{16}H_{23}N_3S_2$.

The product of Example 12 was employed as the accelerator in a composition comprising:

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Antioxidant | 2 |
| Sulfur | 2 |
| 5,5-dimethyl - 3 - phenyl - 2 - imidazolinyl diethyldithiocarbamate | 0.5 |

Vulcanization was completed in 30 minutes at a temperature of 144° C. The following results were obtained:

Modulus—2050 lbs./in.$^2$
Tensile—3900 lbs./in.$^2$
Mooney scorch at 135° C.—5.5 minutes The following examples illustrate the preparation of meta dinitrogen heterocycle esters in which the heterocycle contains three carbon atoms in the ring, two of which are also part of a benzene ring.

EXAMPLE 13

To a stirred solution comprising 37.6 grams (0.25 mole) of 2-mercaptobenzimidazole, 40 grams (0.25 mole) of 25% sodium hydroxide and 250 grams of water was added, in one portion, 38 grams (0.25 mole) of diethylthiocarbamyl chloride and the mixture stirred for four hours. The precipitate was filtered, washed with water until neutral and air-dried. 2-benzimidazolyl diethyldithiocarbamate was obtained in 89% yield as a cream solid. After recrystallization from ethyl alcohol it melted at 169°–171° C. Analysis gave 15.84% nitrogen and 23.95% sulfur compared to 15.83% nitrogen and 24.16% sulfur calculated for $C_{12}H_{15}N_3S_2$.

EXAMPLE 14

To a stirred solution comprising 30 grams (0.2 mole) of 2-mercaptobenzimidazole, 150 ml. of benzene, and 30 ml. of triethylamine was added, in one portion, 35.5 grams (0.2 mole) of diisopropylthiocarbamyl chloride. The mixture was stirred for six hours, cooled and the solid collected by filtration. The 2-benzimidazolyl diisopropyldithiocarbamate thus obtained was slurried with hot methanol and the product filtered from solution. The white solid softened at 152° C. and decomposed above 190° C. Analysis gave 14.1% nitrogen and 21.22% sulfur compared to 14.32% nitrogen and 21.85% sulfur calculated for $C_{14}H_{19}N_3S_2$.

EXAMPLE 15

Substituting an equimolar amount of morpholinothiocarbonyl chloride for the diisopropylthiocarbamyl chloride in Example 14, 2-benzimidazolyl-4-morpholinocarbodithioate was obtained as a pale yellow powder. After slurrying with methanol and filtering, the residue was a white solid melting at 217°–221° C. Analysis gave 14.92% nitrogen and 22.74% sulfur compared to 15.05% nitrogen and 22.96% sulfur calculated for $C_{12}H_{13}N_3OS_2$.

EXAMPLE 16

Substituting an equimolar amount of dibutylthiocarbamyl chloride for the diisopropylthiocarbamyl chloride in Example 14, the product was extracted with ether, the ether layer separated, washed three times with water, and filtered. The filtrate was evaporated to half its volume, slurried in heptane and water, and filtered. 2-benzimidazolyl dibutyldithiocarbamate was obtained as a white solid melting at 127–129° C. Analysis gave 13.57% nitrogen and 19.84% sulfur campared to 13.07% nitrogen and 19.95% sulfur calculated for $C_{16}H_{23}N_3S_2$.

EXAMPLE 17

A solution was prepared by mixing 30 grams (0.2 mole) of 2-mercaptobenzimidazole, 13.2 grams (0.2 mole) 85% potassium hydroxide, 600 ml. of acetone, and 10 ml. of water, heating to 55° C. and, with stirring, maintaining the temperature at 55°–56° C. for 30 minutes. The solution was then cooled to 25° C. and to it was added in one portion, with stirring, 35.6 grams (0.2 mole) of hexamethyleniminothiocarbonyl chloride. The reaction mixture was stirred at 25°–30° C. for 24 hours, then added to 2,000 grams of ice water and stirred at 0°–10° C. for 30 minutes. The precipitate was collected by filtration, washed with water until neutral and air-dried at 25°–30° C. 2-benzimidazolyl hexahydro-1H-azepine - 1 - carbodithioate was obtained in 80.7% yield as a light brown solid. Analysis gave 14.36% nitrogen and 22.48% sulfur compared to 14.42% nitrogen and 22.00% sulfur calculated for $C_{14}H_{17}N_3S_2$. It melted at 190°–191° C. after recrystallization from alcohol.

EXAMPLE 18

To a stirred solution comprising 15 grams (0.1 mole) of 2-mercaptobenzimidazole, 6.6 grams (0.1 mole) of 85% potassium hydroxide, 300 ml. of acetone, and 10 ml. of water was added, in one portion, 12.4 grams (0.1 mole) of dimethylthiocarbamyl chloride. The mixture was then heated at 50°–60° C. for five hours, cooled to 25° C., and added to 1,000 grams of ice water. After stirring for one-half hour, the precipitate was collected by filtration, washed with water until neutral to litmus, and air-dried at room temperature. 2-benzimidazolyl dimethyldithiocarbamate was obtained in 80% yield as a tan solid. After recrystallization from ethyl alcohol it melted at 193°–195° C. Analysis gave 18.04% nitrogen compared to 17.71% calculated for $C_{10}H_{11}N_3S_2$.

EXAMPLE 19

Substituting an equimolar amount of dipropylthiocarbamyl chloride for the dimethylthiocarbamyl chloride in Example 18, the mixture was heated at 50°–60° C. for five hours, added to 1,000 grams of ice water, and isolated as in Example 18. 2-benzimidazolyl dipropyldithiocarbamate was obtained as a yellow solid in 82% yield. After recrystallization from ethyl acetate it melted at 125°–126° C. Analysis gave 14.35% nitrogen and 21.06% sulfur compared to 14.32% nitrogen and 21.85% sulfur calculated for $C_{14}H_{19}N_3S_2$.

EXAMPLE 20

To a stirred solution comprising 15 grams (0.1 mole) of 2-mercaptobenzimidazole, 6.6 grams (0.1 mole) of 85% potassium hydroxide, 150 ml. of acetone, and 5 grams of water was added, in one portion, 20 grams (0.1 mole) of ethylthiocarbaniloyl chloride and the mixture heated at 50°–60° C. for five hours. After cooling to 5° C., 400 ml. of water and 50 ml. of ethyl ether were added and stirring continued at 5°–10° C. for 30 minutes. The precipitate was collected by filtration, washed with water until neutral to litmus, and air-dried at 25°–30° C. 2-benzimidazolyl N-ethyldithiocarbanilate was obtained in 92.5% yield as a tan solid. After recrystallization from ethyl alcohol it melted at 191°–193° C. Analysis gave 12.34% nitrogen compared to 13.41% calculated for $C_{16}H_{15}N_3S_2$.

EXAMPLE 21

To a stirred solution comprising 37.5 grams (0.25 mole) of 2-mercaptobenzimidazole, 16.5 grams (0.25 mole) 85% potassium hydroxide, 300 ml. of acetone, and 10 ml. of water was added, in one portion, 43.9 grams (0.25 mole) of methylthiocarbaniloyl chloride and the mixture heated at 50°–60° C. for five hours. After cooling to 5° C. 500 ml. of cold water were added and stirring continued at 5°–10° C. for 30 minutes. The precipitate was collected by filtration, washed with water until neutral to litmus, and air-dried at 25°–30° C. 2-benzimidazolyl N-methyldithiocarbanilate was obtained in 80% yield as a tan solid. After recrystallization from ethyl alcohol it melted at 229°–230° C. Analysis gave 13.83% nitrogen and 21.41% sulfur compared to 14.04% nitrogen and 21.42% sulfur calculated for $C_{15}H_{13}N_3S_2$.

Employing substantially the same reaction conditions and replacing the methylthiocarbaniloyl chloride with an equimolar amount, respectively, of 1-pyrrolidinylthiocarbonyl chloride and 1-piperidinylthiocarbonyl chloride, further examples were prepared possessing the following physical properties:

EXAMPLE 22

2-benzimidazolyl 1-pyrrolidinecarbodithioate, a tan solid, M.P. 203°–205° C. after recrystallization from ethyl alcohol, in 80.7% yield. Analysis gave 15.88% nitrogen and 24.40% sulfur compared to 15.96% nitrogen and 24.35% sulfur calculated for $C_{12}H_{13}N_3S_2$.

EXAMPLE 23

2-benzimidazolyl 1-piperidinecarbodithioate, a tan solid, M.P. 198°–200° C., after recrystallization from alcohol/chloroform, in 83.5% yield. Analysis gave 14.70% nitrogen and 22.85% sulfur compared to 15.15% nitrogen and 23.11% sulfur calculated for $C_{13}H_{15}N_3S_2$.

The data in the tables below illustrate useful properties for accelerating vulcanization of rubber. A typical natural rubber tread stock was compounded comprising:

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Antioxidant | 1.5 |
| Sulfur | 2.5 |

To each of several portions of the base stock was added 0.5 part by weight of accelerator as indicated below:

| Stock | Accelerator |
|---|---|
| AA | 2-benzimidazolyl N-methyldithiocarbanilate. |
| BB | 2-benzimidazolyl N-ethyldithiocarbanilate. |
| CC | 2-benzimidazolyl 1-pyrrolidinecarbodithioate. |
| DD | 2-benzimidazolyl 1-piperidinecarbodithioate. |

Vulcanization was completed at a temperature of 144° C. The modulus and tensile properties of the 15-minute cures and Mooney scorch are recorded in Table VIII.

TABLE VIII

| Stock | Modulus | Tensile | Mooney scorch |
|---|---|---|---|
| AA | 1,420 | 3,800 | 10.2 |
| BB | 1,430 | 3,950 | 8.8 |
| CC | 2,000 | 4,200 | 8.0 |
| DD | 1,800 | 3,800 | 8.1 |

In the following test the rubber compositions contained a retarder of vulcanization. A stock was compounded comprising:

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Antioxidant | 1.5 |
| Sulfur | 2.5 |
| N-nitrosodiphenylamine | 1 |

To the above there was added in separate stocks 0.5 part of accelerator as follows:

| Stock | Accelerator |
|---|---|
| EE | 2-benzimidazolyl diethyldithiocarbamate. |
| FF | 2-benzimidazolyl diisopropyldithiocarbamate. |
| GG | 2-benzimidazolyl 4-morpholinodithiocarbamate. |
| HH | 2-benzimidazolyl dibutyldithiocarbamate. |

Vulcanization was completed at a temperature of 144° C. The modulus and tensile properties and Mooney scorch are recorded in Table IX.

TABLE IX

| Stock | Cure time in minutes | Modulus | Tensile | Mooney scorch |
|---|---|---|---|---|
| EE | 15 | 1,850 | 4,100 | |
|  | 30 | 2,050 | 3,950 | 6.6 |
|  | 45 | 1,950 | 3,720 | |
|  | 60 | 1,860 | 3,480 | |
| FF | 15 | 950 | 2,380 | |
|  | 30 | 1,400 | 3,370 | 7.4 |
|  | 45 | 1,670 | 3,440 | |
|  | 60 | 1,670 | 3,190 | |
| GG | 15 | 1,010 | 2,630 | |
|  | 30 | 1,400 | 3,020 | 8.4 |
|  | 45 | 1,540 | 3,090 | |
|  | 60 | 1,540 | 3,130 | |
| HH | 15 | 1,900 | 3,710 | |
|  | 30 | 2,050 | 3,700 | 7.5 |
|  | 45 | 1,950 | 3,520 | |
|  | 60 | 1,930 | 3,330 | |

Butadiene-styrene copolymer rubber was blended in a standard formula as follows:

| | Parts by weight |
|---|---|
| SB–R 1500 | 100 |
| Carbon black | 50 |
| Zinc oxide | 4 |
| Stearic acid | 2 |
| Saturated hydrocarbon softener | 10 |
| Antioxidant | 1.5 |
| Sulfur | 1.75 |

To each of several portions of the base stock was added 1.2 parts by weight of accelerator as indicated below:

| Stock | Accelerator |
|---|---|
| JJ | 2-benzimidazolyl diethyldithiocarbamate. |
| KK | 2-benzimidazolyl 1-pyrrolidinecarbodithioate. |

Vulcanization was completed at a temperature of 144° C. The modulus and tensile properties of the 60-minute cures and Mooney scorch are recorded in Table X.

TABLE X

| Stock | Modulus | Tensile | Mooney scorch |
|---|---|---|---|
| JJ | 1,150 | 3,300 | 18.9 |
| KK | 840 | 2,700 | 29.8 |

The product of Example 17 was employed as the accelerator in a composition comprising:

| | Parts by weight |
|---|---|
| Smoked sheets rubber | 100 |
| Carbon black | 50 |
| Zinc oxide | 5 |
| Stearic acid | 3 |
| Saturated hydrocarbon softener | 3 |
| Sulfur | 2.5 |
| 2-benzimidazolyl hexahydro - 1H - azepine-1-carbodithioate | 0.5 |

Vulcanization was completed in 30 minutes at a temperature of 144° C. and the following results were obtained:

Modulus—2350 lbs./in.$^2$
Tensile—3300 lbs./in.$^2$
Mooney scorch at 135° C.—10.3 minutes The accelerator dosage will usually fall within the range of 0.1–5.0 parts accelerator per 100 parts by weight of rubber. As mentioned above the new compounds are useful for accelerating the vulcanization of EPDM rubber, and in this and other rubbers of low unsaturation the accelerator dosage will usually be higher than for natural rubber. Moreover, it may be expedient to use the new compounds in conjunction with a secondary accelerator, as for example 2-mercaptobenzothiazole.

The American Society for Testing Materials (ASTM) defines EPDM in the 1965 Book of ASTM Standards, part 28, p. 695, as follows: "EPDM—Terpolymer containing ethylene and propylene in the backbone and a diene in the side chain." Amberg discusses the dienes which have been used with ethylene and propylene in Vulcanization of Elastomers, 324, 325 (Alliger and Sjothum ed., 1963). Amberg states: "Good results have been obtained with compounds which have one internal and one terminal double bond. Dicyclopentadiene is one of the preferred dienes. 2-methylene-norbornene and 11-ethyl-1,11-tridecadiene are examples of other monomers which react satisfactorily." Cyclooctadiene and 1,4-hexadiene are also used as the diene monomer of EPDM. The addition of 1.5 parts by weight of one of the new accelerators followed by curing for 10 minutes at 160° C. has given good results in the following composition:

| | Parts by weight |
|---|---|
| EPDM | 100 |
| Zinc oxide | 5 |
| Carbon black | 80 |
| Aromatic processing oil | 40 |
| Sulfur | 1.5 |
| 2-mercaptobenzothiazole | 0.5 |

It is intended to cover all changes and modifications of the examples of the invention herein chosen for purposes of disclosure which do not constitute departures from the spirit and scope of the invention.

What is claimed is:

1. A compound of the formula

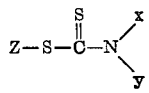

where $x$ and $y$ independently are selected from the group consisting of alkyl of 1 to 5 carbon atoms, allyl, methallyl, 2-chloroallyl, 2-bromoallyl, cyclopentyl, cyclohexyl, phenyl, tolyl, naphthyl, benzyl, and phenethyl and taken together with the nitrogen are selected from the group consisting of pyrrolidinyl, piperidino, 2-methyl-5-ethylpiperidino, hexamethyleneimino, morpholino, 2,6-dimethylmorpholino, 2,5-dimethylpyrrolidinyl, heptamethylenamino and octamethylenimino; and Z is selected from the group consisting of unsubstituted 2-pyrimidinyl, unsubstituted dihydro-2-pyrimidinyl, unsubstituted tetrahydro-2-pyrimidinyl, or one of aforesaid containing one to four substituents selected from the group consisting of alkyl of 1 to 5 carbon atoms, benzyl, phenethyl, cyclopentyl, cyclohexyl, tolyl, phenyl and naphthyl.

2. Compound of claim 1 wherein Z is tetrahydropyrimidinyl.

3. Compound of claim 1 wherein Z is 5-methyltetrahydropyrimidinyl.

4. Compound of claim 1 wherein Z is 4,6,6-trimethyl dihydropyrimidinyl.

5. Compound of claim 1 wherein Z is 3-isopropyl-4,6,6-trimethyl dihydropyrimidinyl.

6. Compound of claim 1 wherein Z is 3-phenyl-4,6,6-trimethyl dihydropyrimidinyl.

7. Compound of claim 1 wherein Z is 4,6-dimethylpyrimidinyl.

8. Compound of claim 7 wherein $x$ is alkyl of 1 to 5 carbon atoms and $y$ is phenyl.

9. Compound of claim 7 wherein

is piperidino.

10. Compound of claim 7 wherein $x$ and $y$ are methyl.

11. Compound of claim 7 wherein

is pyrrolidinyl.

12. Compound of claim 7 wherein

is morpholinyl.

13. Compound of claim 7 wherein

is hexamethylenimino.

14. Compound of claim 7 wherein $x$ and $y$ are alkyl of 1 to 5 carbon atoms.

15. Compound of claim 7 wherein $x$ and $y$ are taken together.

References Cited

UNITED STATES PATENTS

| 3,120,507 | 2/1964 | Andrew et al. | 260—256.5X |
| 3,151,114 | 9/1964 | D'Amico et al. | 260—256.5 |

FOREIGN PATENTS

| 206,118 | 10/1939 | Switzerland | 260—256.5 |

ALEX MAZEL, Primary Examiner

J. H. TURNIPSEED, Assistant Examiner

U.S. Cl. X.R.

71—94; 252—107; 260—79.5, 256.5; 424—248, 250